Sept. 23, 1952     E. P. BULLARD, III     2,611,290
METHOD OF TURNING WORK
Filed May 8, 1946     6 Sheets-Sheet 1
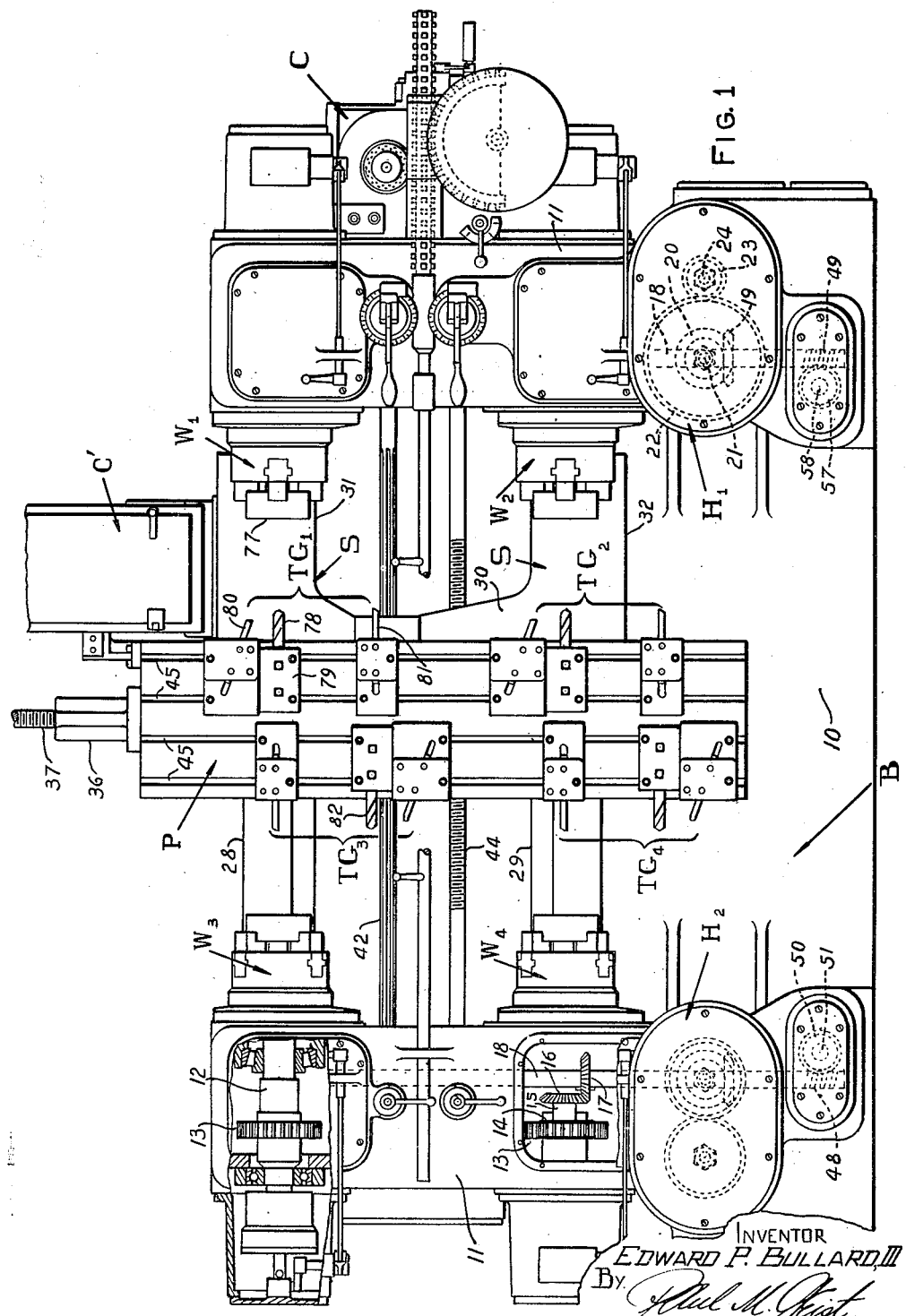
INVENTOR
EDWARD P. BULLARD, III
BY
ATTORNEY Sept. 23, 1952 E. P. BULLARD, III 2,611,290
METHOD OF TURNING WORK
Filed May 8, 1946 6 Sheets-Sheet 2
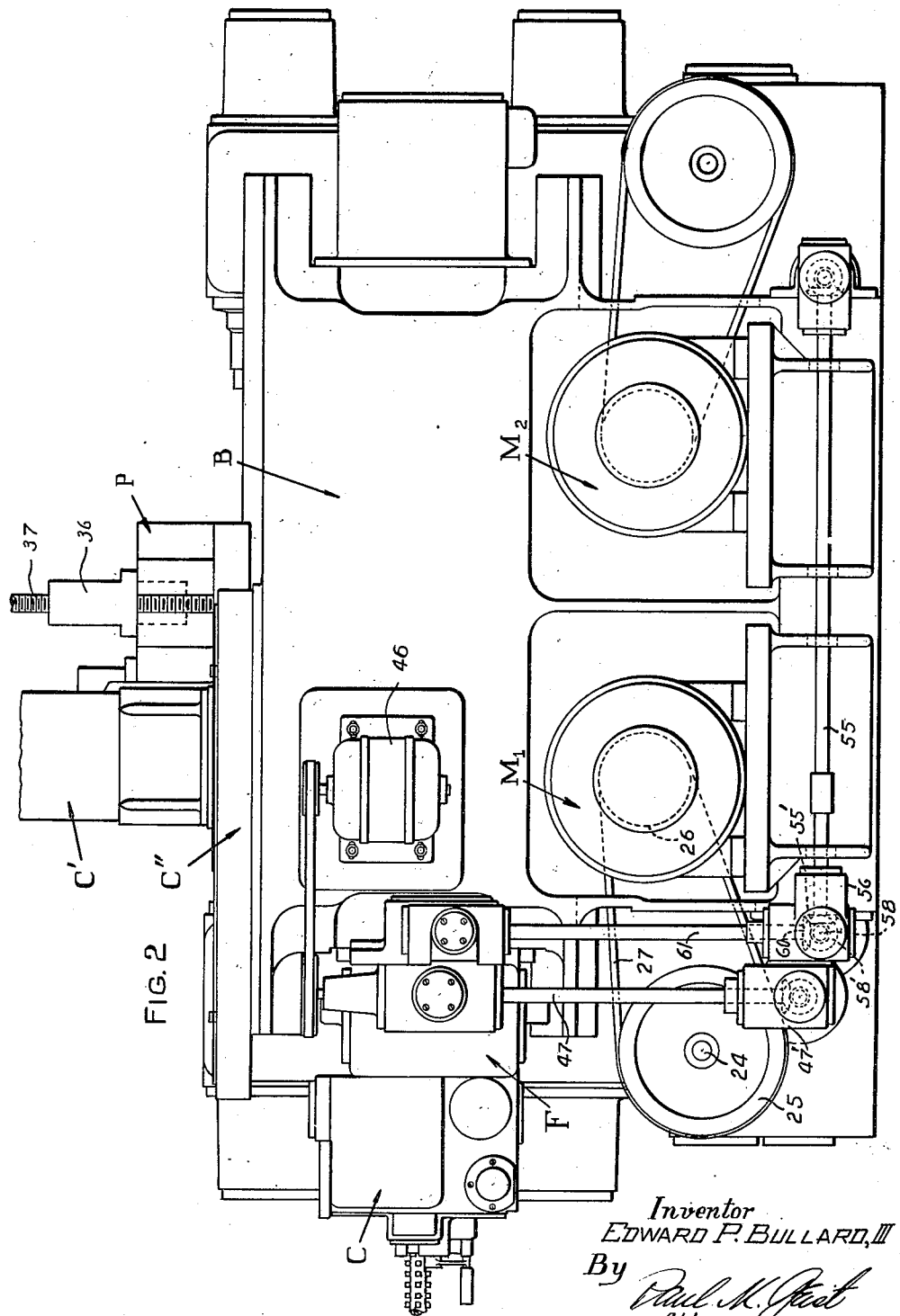
Inventor
EDWARD P. BULLARD, III
By
Paul M. Gest
Attorney

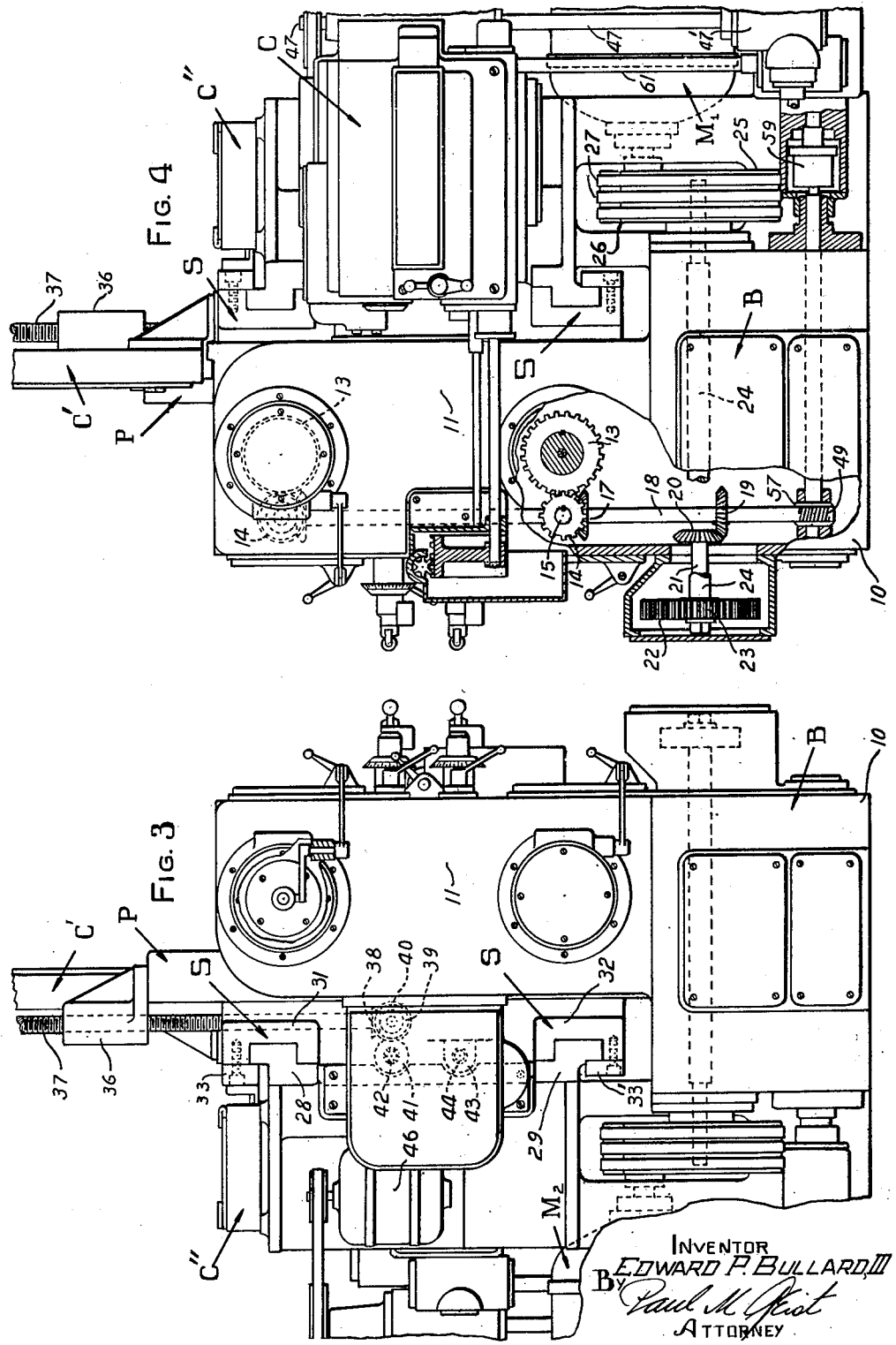

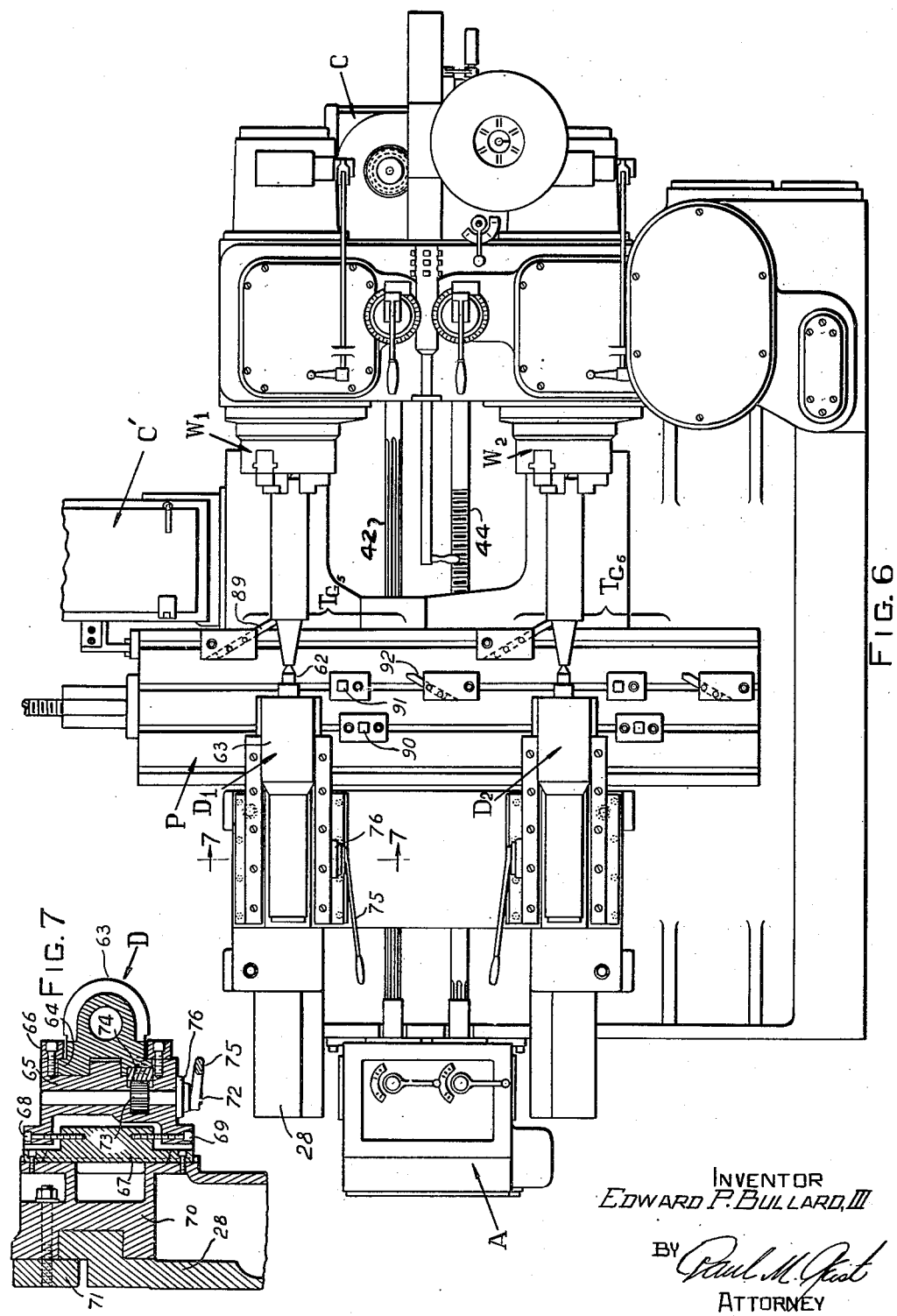

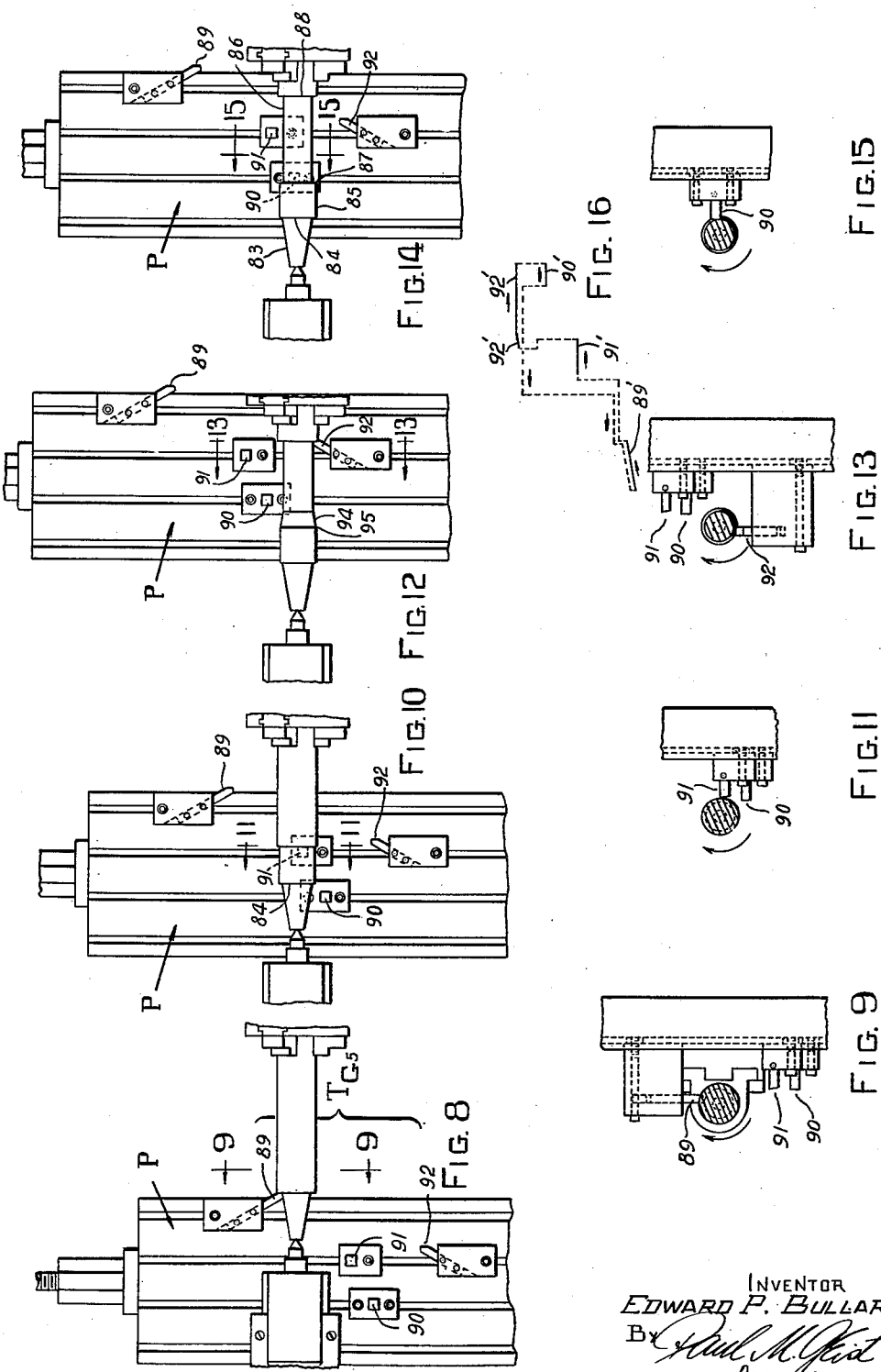

Patented Sept. 23, 1952

2,611,290

UNITED STATES PATENT OFFICE 2,611,290

METHOD OF TURNING WORK

Edward P. Bullard, III, Fairfield, Conn., assignor to The Bullard Company, a corporation of Connecticut Application May 8, 1946, Serial No. 668,174

2 Claims. (Cl. 82—25)

1

This invention relates to the art of turning and particularly to a new method of turning metal work.

The art of turning may be divided into two groups, namely, center turning which involves supporting the work to be turned at each end along its longitudinal, or turning axis; and, chucking which involves gripping the work at one end leaving the other end unsupported.

Prior-known center turning operations of the type that removed metal from work by moving the tool parallel to the axis of rotation involve the movement of a tool radially of the work to a predetermined depth, and then parallel with the axis of turning. Although more than two tools on a single tool holder can be simultaneously employed to turn different diameters on a work piece in such a method, only two can be employed to perform different successive turning operations, i. e., one that approaches the work radially from one direction, and one that approaches the work radially from an opposite direction.

Turning operations in accordance with prior-known chucking methods, where a plurality of separate tools were required for different operations, involved the use of a rotatable turret, each face of which could support at least one tool. Should a plurality of tools be supported by a single turret face they were required simultaneously to operate on the work. Other turning operations in accordance with prior-known chucking methods, where turrets are not employed, are restricted to single cycles of operation within which all separately-operating tools must complete their work.

Objects of this invention include the provision of a new center and chucking method of turning which involves the successive use of more than two tools without employing a rotatable turret and wherein separate groups of one or more tools may be moved through a main cycle of operations involving separate sub-cycles for each tool of said group or combination of tools in said group; the provision of such a center and chucking method of turning involving a common non-rotatable tool support for a plurality of groups of more than two tools each for simultaneously performing identical operations on a plurality of work pieces; the provision of apparatus for performing the above-referred to method; the provision of such an apparatus wherein a non-rotatable platen is provided that is adapted to be moved along intersecting paths and to support more than two tools that are successively caused to perform working operations on a rotating work

2 piece; the provision of such an apparatus wherein the non-rotatable platen is common to a plurality of independent work-supporting spindles at which identical operations on work are simultaneously performed; and the provision of such an apparatus that includes an automatic control for causing the platen successively to move along said intersecting paths a plurality of times, for different overlapping distances and in any order within a pre-determined cycle of operations.

The above as well as other objects and novel features of the invention will become apparent from the following specification and accompanying drawings, in which, Figure 1 is a front elevational view of apparatus capable of performing one species of the method of this invention;

Fig. 2 is a back elevational view of the apparatus shown in Fig. 1;

Fig. 3 is a left hand end elevational view of the apparatus shown in Fig. 1;

Fig. 4 is a right hand end elevational view of the apparatus shown in Fig. 1;

Fig. 6 is a front elevational view of apparatus capable of performing another species of the method of this invention;

Fig. 7 is a sectional view taken substantially along lines 7—7 of Fig. 6;

Figure 5:
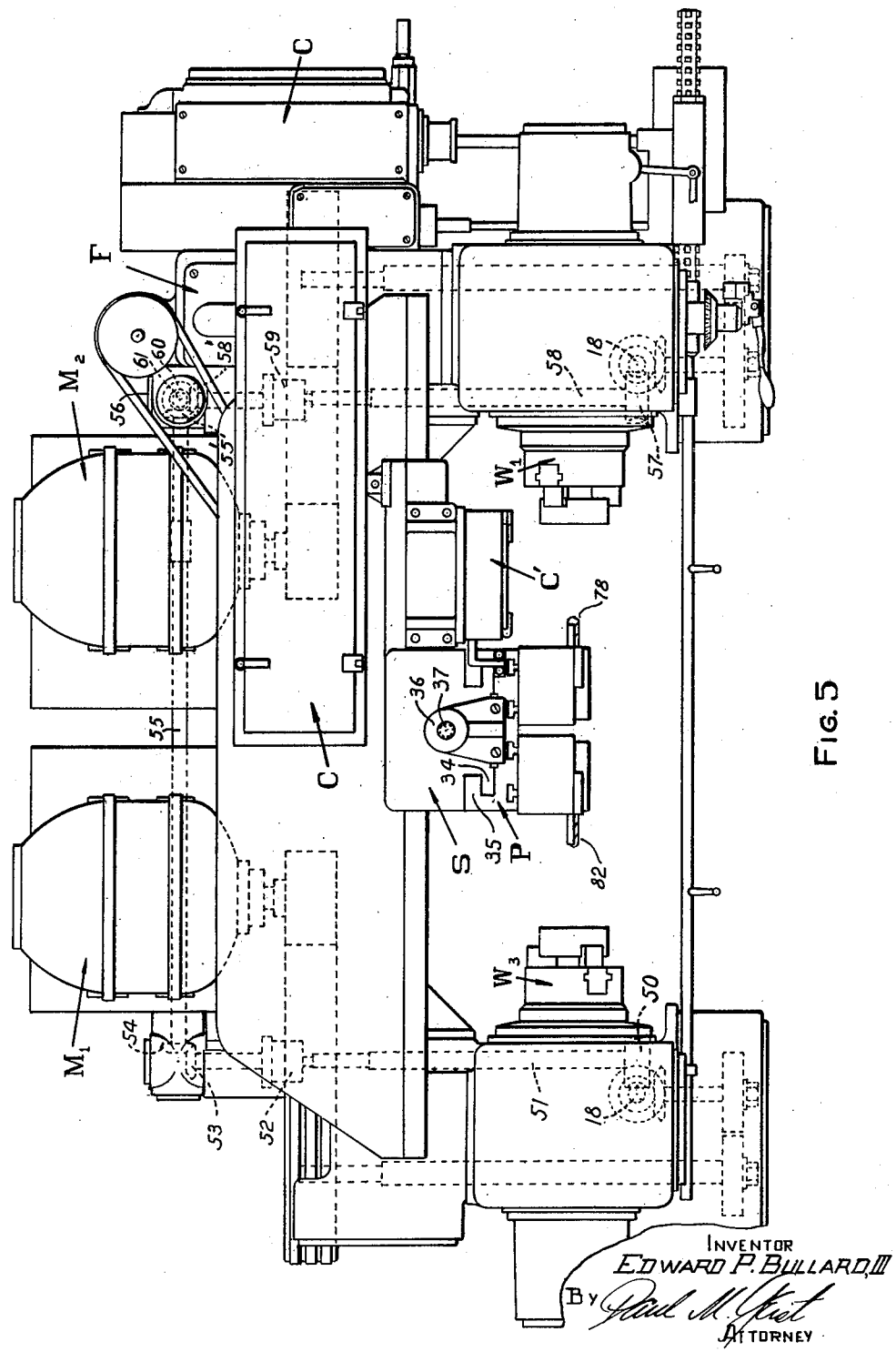
Fig. 5 is a top plan view of the apparatus shown in Fig. 1.

Figs. 8 to 15 inclusive show the relation of a plurality of tools in varying stages throughout the one species of the method of this invention; and Fig. 16 is a diagram of the tool movement in producing the finished work piece of Fig. 14.

There are two species to the method of this invention and they will be described after the apparatus for carrying out the two species has been described.

Referring to the drawings and particularly to Figs. 1 to 5, the invention is shown as applied to a multiple spindle chucking lathe comprising a base B that includes brackets for supporting a plurality of chucks $W_1$, $W_2$, $W_3$ and $W_4$, the spindles of each of which in the present embodiment being shown as parallel, horizontally disposed and vertically spaced.

The chucks $W_1$ and $W_2$ are adapted to be rotated simultaneously at a plurality of predeterminable speeds through a headstock transmission $H_1$; and the chucks $W_3$ and $W_4$ are adapted to be rotated in a similar manner by a headstock transmission $H_2$. As shown in Fig. 2, the headstocks $H_1$ and $H_2$ are supplied with rotary power from two motors $M_1$ and $M_2$ located at the back of the base B.

The base B also includes horizontal ways for slidably supporting a saddle S (Figs. 3, 4 and 5) on which a non-rotatable platen P is mounted for substantially vertical motion. The platen P is relatively long and is common to all of the chucks $W_1$ to $W_4$ inclusive. Separate pre-set tool groups $T_{G1}$, $T_{G2}$, $T_{G3}$ and $T_{G4}$, respectively, for the four chucks $W_1$ to $W_4$ inclusive are mounted on the platen P. Each of the tool groups is pre-set on the platen P such that the tools thereof may successively either singly or in plural arrangement operate upon work mounted within the chucks $W_1$ to $W_4$. The groups $T_{G1}$ and $T_{G2}$ include identically-arranged tools that simultaneously perform identical operations on identical work in chucks $W_1$ and $W_2$. The tool groups $T_{G3}$ and $T_{G4}$ likewise include identically-arranged tools, but this grouping may be the same or different from the groups $T_{G1}$ and $T_{G2}$ for performing identical operations on work at chucks $W_3$ and $W_4$ which operations may be the same or different from those performed at chucks $W_1$ and $W_2$. The platen P is adapted to be moved universally in a vertical plane by the horizontal movement of the saddle S and the vertical movement of the platen P. This universal motion is produced at a plurality of different feed rates and a relatively rapid traverse rate by a feed works transmission F (Fig. 2) in a manner to be described later.

In producing a series of working operations on the work in the chucks $W_1$ to $W_4$ inclusive, a plurality of certain operations may be performed simultaneously, while others must be performed successively in producing the completed work piece. All of these operations for a work piece constitute a cycle of operations involving numerous sub-cycles for the successively operated tools. The present invention contemplates moving the platen P throughout the above referred to main cycle of operations including a plurality of sub-cycles by employing a controller C that is adapted to be pre-set for causing the platen P to move along either or both of its paths of travel at selected feed rates and at a rapid traverse rate. Auxiliary control devices C' and C'' are provided for determining the point within each movement of the platen P at which it is required to be stopped and for initiating the next succeeding movement or function within the cycle.

Referring to Fig. 6 an embodiment of the invention has been disclosed for carrying out a species of the method of this invention other than that performed by the apparatus of Fig. 1. This device of Fig. 6 is substantially the same as that of Fig. 1 except that the chucks $W_3$ and $W_4$ have been replaced by dead centers $D_1$ and $D_2$ that co-operate with chucks $W_1$ and $W_2$ for performing center turning operations on work; and, an angular turning attachment A has been provided for causing the platen P to be moved along angular paths.

Referring to Figs. 1 to 4, the base B comprises a vertically-disposed elongated standard 10 extending from the bottom of the lathe to substantially the top thereof. Vertically disposed columns 11 are rigidly bolted to the standard 10. The right hand column 11 is adapted to support the chucks $W_1$ and $W_2$ together with their attending parts; and, the left hand column 11 is adapted to support the chucks $W_3$ and $W_4$ with their attending parts. Each chuck is provided with a spindle 12 (only one being shown) mounted in anti-friction bearings within its respective column 11. Referring to Fig. 1, there is provided a spur gear 13 on the spindle 12 that is adapted to mesh with a pinion 14 on a stub shaft 15 that also supports a bevel gear 16 in mesh with a similar bevel gear 17 keyed to a vertically disposed shaft 18. The shaft 18 extends between the two chucks $W_3$ and $W_4$, the drive therefrom to the spindle 12 for chuck $W_4$ only being shown. An identical drive from shaft 18 is provided for the chuck $W_3$. An identical shaft 18 and dual drive for chucks $W_1$ and $W_2$ is located within the right-hand column 11. Referring to Fig. 4, the shaft 18 for chucks $W_1$ and $W_2$ is provided with a bevel gear 19 that meshes with a bevel gear 20 fixed to a shaft 21. The shaft 21 fixedly supports a spur gear 22 in mesh with a pinion 23 keyed to a shaft 24 that extends rearwardly of the machine and supports a V-grooved sheave 25. A similar V-grooved sheave 26 is mounted on the shaft of motor $M_1$, and V-belts 27 extend between the sheaves 25 and 26. From the foregoing it is evident that rotation of the motor $M_1$ will cause rotation of the shaft 18 for chucks $W_1$ and $W_2$ and consequently rotation of the spindles 12 for said chucks. The motor $M_1$ is a constant horsepower, direct current motor that is adapted to be operated in accordance with the method disclosed in application Serial Number 549,254, filed August 12, 1944, in the name of Edward P. Bullard, III, now abandoned. The gears 22 and 23 are pick-off gears and can be pre-selected in accordance with the method disclosed in the above identified application.

A motor $M_2$ is provided for driving the shaft 18 in the left-hand column 11 (Fig. 1) for chucks $W_3$ and $W_4$ in the same manner that motor $M_1$ drives chucks $W_1$ and $W_2$.

The vertical portion 10 of the base B includes horizontally-disposed ways 28 and 29 along which the saddle S is adapted to be moved. The saddle S includes a cast iron portion 30 that extends between the ways 28 and 29 and is provided with guide portions 31 and 32 (Fig. 3) that extend around the ways 28 and 29. Gibs 33 and 33' are provided for maintaining the saddle S in proper relation with the ways 28 and 29. The front face of the saddle S is provided with a way 34 (Fig. 5) that is adapted to receive a slide bearing 35 formed on the back of the platen P. The top of the platen P includes a threaded sleeve 36 (Fig. 3) rigidly mounted thereon, into which a screw 37 is threaded. The screw 37 is rotatably mounted in the saddle S and extends from a point substantially above the lathe downwardly to a point near the center of the lathe. The lower end of the screw 37 is provided with a bevel gear 38 in mesh with a bevel gear 39 that is mounted on a stub shaft located in a recess within the back face of the saddle S. A spur gear 40 is driven by the bevel gear 39 and it meshes with a pinion 41 splined to a shaft 42 that extends throughout the length of the lathe (Fig. 1). The construction and arrangement of the parts are such that rotation of the splined shaft 42 causes rotation of the screw 37 to move the platen P vertically along way 34 in substantially the same way that shaft 349 of Patent 2,384,809 granted September 18, 1945, to Edward P. Bullard, III, et al., moves slide 351 thereof. Referring to Fig. 3, the back of the saddle S is provided with a threaded nut 43 rigidly attached thereto that is threaded onto a screw 44 extending throughout the length of the lathe in the same manner as splined shaft 42. Rotation of the screw 44 therefore causes horizontal movement of the saddle S along the ways 28 and 29.

Accordingly, the mounting for the pinion 41 is such that said pinion runs in mesh with the gear 40 at all times and moves along the splined shaft 42 with the saddle S.

The front face of the platen P is provided with longitudinally-extended slots 45 for receiving tool blocks. It is noted that the platen P is non-rotatable and provides a plane surface that is adapted to be universally moved within a vertical plane. The screw 44 and the splined shaft 42 are adapted to be rotated in either direction at a plurality of different feed rates and at a relatively fast traverse rate by the feedworks transmission F (Fig. 2). The feedworks transmission F is substantially identical with that disclosed in Patent 2,384,809, granted September 18, 1945, to Edward P. Bullard, III, et al. There is, however, a distinction between the feedworks F shown in this case and that of the above identified patent comprising a separate motor 46 on the back of the base B (Fig. 2) for driving the traverse shaft 47 of the feedworks F. The traverse shaft 47 extends downwardly into a gear box 47' and includes a bevel gear train for driving a lubricating pump for the lathe.

As disclosed in the above referred to patent, the power for operating the feedworks to obtain the rotation of the splined shaft 42 and screw 44 is supplied from the headstock transmission. Inasmuch as there are two headstock transmissions $H_1$ and $H_2$ for the chucks $W_1$, $W_2$ on the one hand and $W_3$, $W_4$ on the other, and since chucks $W_1$, $W_2$ are rotated while chucks $W_3$, $W_4$ are idle, it is necessary to provide an overrunning clutch mechanism between the headstocks $H_1$ and $H_2$ for supplying rotary power to the single feedworks F from both of said headstocks. This has been accomplished by providing worms 48 and 49 on the lower ends of the shafts 18 in the left and right hand columns 11. The worm 48 meshes with a worm gear 50 on a shaft 51 (Fig. 1) that extends rearwardly of the machine through a conventional overrunning clutch 52 (Fig. 5) and supports on its rear end a bevel gear 53 that meshes with an identical bevel gear 54 keyed to a shaft 55 that extends rightwardly along the rear of the lathe to a gear box 56 adjacent to the feedworks F. The worm 49 (Fig. 1) meshes with a worm gear 57 that is fixed to a shaft 58 (Fig. 5) extending rearwardly of the lathe and through another conventional overrunning clutch 59. The rear end of the shaft 58 likewise extends into the gear box 56. Each of the shafts 55 and 58 is provided with identical bevel gears 55' and 58' that mesh with a bevel gear 60 keyed to a vertically disposed shaft 61. The bevel gears 55' and 58' on the ends of the shafts 55 and 58 do not mesh with each other but each meshes with the bevel gear 60 keyed to the shaft 61. From the foregoing it is evident that regardless which motor $M_1$ or $M_2$ is rotating, vertically disposed shaft 61 will be supplied with rotary power. The shaft 61 is rotated only in one direction, however, the feedworks F as fully disclosed in the above identified patent is provided with a reverse gear transmission for rotating the screw 44 and the splined shaft 42 at any one of sixteen different feed rates in either direction.

The controller C (Figs. 1, 2 and 4) is substantially the same as that shown, described and claimed in Patent 2,384,809, granted September 18, 1945, in the name of Edward P. Bullard, III, et al. It is adapted to be pre-set for automatically causing the platen P to be moved along either of its paths of motion for different overlapping distances within a cycle of operations. The feedworks F is adapted to be operated manually at any point within a cycle of operations set up on controller C without in any way affecting its pre-setting, in the same way as that disclosed in Patent 2,384,809. The auxiliary controllers C' and C'' are substantially the same as the auxiliary controllers $F_d$ of Patent No. 2,528,736, granted November 7, 1950, in the name of Edward P. Bullard, III. They are adapted to be pre-set for causing the platen P to begin a next succeeding function upon its arrival at a predetermined point along its paths of travel as dictated by the last preceding function of the controller C.

Referring to Fig. 6, the left hand column 11 together with chucks $W_3$ and $W_4$ have been replaced by dead centers $D_1$ and $D_2$. Since they are of identical construction, only the center $D_1$ will be described. It comprises a center 62 mounted within a reciprocable slide 63 including ears 64 (Fig. 7) that are slidingly held against a frame 65 by gibs 66. The frame 65 is dovetailed to a support 67 for slight vertical motion. Adjusting screws 68 and 69 are provided between the frame 65 and the support 67 for adjusting the vertical position of the center 62. Frame 67 is fixed to a saddle 70 that is rigidly but removably attached to the way 28 by a clamping plate 71.

A shaft 72 is journaled in the frame 65 and has fixed to it a pinion 73 in mesh with a rack 74 fixed to the slide 63. A handle 75 is attached to the shaft 72 and an overrunning clutch 76 is provided between the handle 75 and the shaft 72. The construction and arrangement of the parts are such that leftward movement of handle 75 (Fig. 6) causes no rotation of shaft 72 but releases it for independent action; whereas, rightward movement thereof positively rotates shaft 72 to cause slide 63 to move rightwardly through the action of rack 74 and pinion 73.

*Chucking method*

Referring to Fig. 1, the chucking species of the method of turning of this invention wherein a plurality of different tools are to be used either simultaneously or successively, involves the pre-setting of a group of tools such as the group $T_{G1}$ in a predetermined relationship so that a piece of work held in the chuck $W_1$ can be machined. The tools in the groups shown on platen P have been pre-set to perform only a few simple operations on a work piece and the pre-setting of these tools will be specifically described to illustrate the method of this invention.

Assume that the work-piece 77 is to be drilled along its central axis of rotation, turned to a specific diameter and faced. A drill 78 is mounted in a tool block 79 that is rigidly attached to the platen P in position such that rightward movement of the platen with the chuck $W_1$ rotating will cause the desired drilling operation. Since the turning of the work 77 to a given diameter also requires rightward movement of the platen P, a turning tool 80 is pre-set thereon in position such that it turns the work during the drilling operation. Upon completion of these two operations, the platen is moved rearwardly and upwardly a sufficient distance so that a tool 81 faces the work 77 without encountering any interference from tools 78 and 80. In a similar manner, the tools of group $T_{G2}$ are pre-set on the platen P to perform identical operations on a work piece in chuck $W_2$ simultaneously with the working of piece 77.

Although different operations can be performed on work in the chuck $W_3$ and $W_4$ from that produced on work at chucks $W_1$ and $W_2$, that which is shown in Fig. 1 is the same for all four chucks. Accordingly, the tools of group $T_{G3}$ are pre-set in a similar fashion as were the tools of group $T_{G1}$. However, the drill 82 is pre-set so that when tool 81 has completely faced work 77, drill 82 will be on the axial centerline of the work in chuck $W_3$. Finally, the tools of group $T_{G4}$ are pre-set on platen P in relation to the group $T_{G3}$ as group $T_{G2}$ was set relatively to group $T_{G1}$.

From the foregoing, it is evident that two pieces of identical work can be produced simultaneously at chucks $W_1$ and $W_2$ with a plurality of different tools mounted on a non-rotatable platen that can successively be moved along intersecting paths. And, the same or different work can be produced in a similar manner at chucks $W_3$ and $W_4$. Furthermore, the pre-setting of the tools of each group is such that one or more may be used during a sub-cycle to perform certain operations and a plurality of such sub-cycles may be produced in a complete cycle of operation, without interference being encountered between any of the tools employed in successive sub-cycles.

The movement of platen P along its intersecting paths is effected by the selective operation of the feedworks transmission F, which in turn may automatically be controlled by the main and auxiliary controls C, C' and C''. This method contemplates the pre-setting of the function drum of the main control C so that the operations in each sub-cycle to perform the desired work is automatically accomplished. This pre-setting of the controls C, C' and C'' is accomplished in the same manner as that disclosed in Patent 2,384,809 and Patent 2,528,736 both above referred to.

From the foregoing it is evident that this species of the method of this invention includes: (a) pre-setting a group of non-rotatable tools on a non-rotatable platen so that the entire group can be moved through a main cycle of operations involving a plurality of sub-cycles in each of the latter of which one or more tools may be employed simultaneously and such that no interference occurs between any of the tools while moving the platen throughout the main cycle of operations; (b) rotating the work; and (c) moving the platen either manually or automatically through said main cycle of operations involving said sub-cycles.

*Center turning method*

The center turning species of the method of this invention will be described with reference to Figs. 8 to 15 inclusive. The following two definitions will be helpful throughout the description of this species. Tangential movement of the cutting edge of a tool into working position means the movement of the tool to a point where its cutting edge lies substantially in a plane perpendicular to said path of tool movement and passing through the axial centerline of the work. Radial movement of the cutting edge of a tool into working position means the movement of the cutting edge along a radius of the work.

Assume a finished work piece having the contour shown in Fig. 14 is desired to be produced from cylindrical stock held between a dead center and a chuck. This piece of work includes a tapered portion 83 that terminates in a shoulder 84; a cylindrical portion 85 of a specific diameter and another cylindrical portion 86 of less diameter than that of portion 85 located between two shoulders 87 and 88.

Referring to Figs. 8 to 15 inclusive, four tools 89, 90, 91 and 92, comprising a group $T_{G5}$, are pre-set on the platen P in a somewhat similar manner to the pre-setting of the tools of groups $T_{G1}$, etc. That is, the platen can be moved throughout a cycle of operations involving a plurality of sub-cycles in each of the latter of which one or more tools may simultaneously perform working operations, without any of the tools of the group interfering with the action of the others. In this species of the method of this invention, only two tools, namely 89 and 92 are pre-set for radial movement relatively to the work into operating position. Although only two tools, namely 90 and 91, are shown pre-set on platen P for tangential movement into operating position, it is to be understood that any number of such tools may be pre-set between the tool 89 as an upper limit and tool 92 as a lower limit. The only limitation on the tools set as per tools 90, 91 is that there must be one for each different diameter required to be produced on the work, and they are only effective for cylindrical turning.

The tapered portion 83 is produced by moving the platen P, and with it tool 89, along an angular path including components of horizontal and vertical motion by the action of the angular turning attachment A. This attachment is substantially the same as that shown, described and claimed in Patent No. 2,351,921 granted to E. P. Bullard, III, et al., on June 20, 1944, except that the clutches shown in said patent for connecting shafts 115 and 116 therein to shafts 45 and 50 are hydraulically moved in the present instance into and out of engagement to connect and disconnect them to shafts 42 and 44 under the control of the device C in a manner similar to the operation of the feedworks clutches of Patent 2,384,809 by the function drum 654 thereof.

Since the diameter of the stock is greater than that of portion 85, tool 91 is pre-set on platen P so that its cutting edge extends outwardly from the platen surface a distance sufficient to produce the desired diameter of portion 85. The controls C, C' and C'' are then pre-set to cause platen P to move in a combination of directions along its intersecting paths so that tool 91 is tangentially moved upwardly to cutting position within the extent of the tapered portion 83, where the diameter of the work is less than that of portion 85. When the tool 91 is in cutting position (to the left of shoulder 84 Figs. 10 and 11), it is moved rightwardly a pre-determined amount (Fig. 10) parallel with the longitudinal axis of the work.

The third tool to be used in the group $T_{G5}$, is 92 which is employed to produce the portion 86 between shoulders 87 and 88. This is accomplished by moving the platen along a path such that the tool 92 is moved radially into cutting position, and then under the influence of the attachment A to produce the surface 94 (Fig. 12). The length of surface 94 is such as to produce the correct diameter of the portion 86. Finally, the tool 90 is moved along a path parallel with the longitudinal axis of the work.

In order to use tool 92 prior to the use of tool 90, the latter must be moved from a position below the work (Fig. 10) to a position above the work (Fig. 12). However, the tool 90 is pre-set to produce a diameter less than that of the portion 85. Accordingly, it must be moved to a position above the work within the extent of the portion 83 having a diameter less than that for which tool 90 is set to produce. Pre-set tools on platen P that are to be moved tangentially into cutting position can be moved from a point below, to a point above the work or vice versa and still clear the work, regardless of their setting so long as they are pre-set to cut a diameter of the work. This is true because the dead center engages the work in a manner always to produce a clearance for such tool accommodation. With the tool 90 above the work and tool 92 below, the platen P is moved rightwardly and vertically upwardly until the cutting edge of tool 92 is at a point 95, whereupon attachment A takes over causing the tool to produce the angular surface 94 of such length that the diameter of portion 86 is established. The platen is then caused to move rightwardly to the shoulder 86. The work is now complete except for removing the stock including surface 94 to produce the shoulder 87. This is accomplished by tool 90 which is moved downwardly and tangentially into cutting position at a point rightwardly of surface 94, and then leftwardly to produce shoulder 87. Finally, the platen is moved upwardly, then leftwardly and downwardly to the starting point. While the platen P can be moved by manually operating the feedworks F, it is preferred automatically to be moved through the above cycle of operations by pre-setting the controls C, C' and C''.

Referring to Fig. 16, the path traced by tool 89 in cutting the work is shown at 89'; that by tool 91 is shown at 91'; that by tool 92 is shown at 92'; and that by tool 90 is shown at 90'.

Referring again to Fig. 6, the group of tools T_G6 is pre-set on platen P identically as the tools of group T_G5 are pre-set so that two work pieces of identical design are simultaneously performed by the selective movement of the platen P throughout a cycle of operations which includes the individual sub-cycles of the various tools.

From the foregoing it is evident that the center-turning species of the method of this invention includes the steps (a) rotating a work piece between two centers; (b) successively moving one or more tools tangentially into cutting position relatively to the work; and (c) moving each tool parallel to the axis of turning of the work when it is in cutting position.

Although the various features of the improved lathe and method have been shown and described in detail to fully disclose several embodiments of the invention, it will be evident that numerous changes may be made in such details, and certain features can be used without others, without departing from the principles of the invention.

What is claimed is:

1. The method of center turning work which comprises, rotating a workpiece between centers, moving the cutting edge of a non-rotary tool tangentially to working position from one side of said workpiece and then moving said tool axially of said workpiece when said tangentially-fed tool is in working position; subsequently moving the cutting edge of a second non-rotary tool to working position from said one side of said workpiece while maintaining said tools in relatively fixed spaced relation and then moving said second tool axially of said workpiece when said second tool is in working position, whereby said tangentially-fed tool clears the work as the second tool is fed toward the work.

2. The method of center turning work which comprises, rotating a workpiece between centers, moving the cutting edge of a non-rotary tool radially to working position from one side of said workpiece, and then moving said tool axially of said workpiece; subsequently moving the cutting edge of a non-rotary tool tangentially to working position from the opposite side of said workpiece, and then moving said tangentially-fed tool axially of said workpiece when said tangentially-fed tool is in working position; subsequently moving the cutting edge of a non-rotary tool radially to working position from said opposite side of said workpiece while maintaining all said tools in relatively fixed spaced relation, and then moving said last-mentioned radially-fed tool axially of said workpiece when said radially-fed tool is in working position, whereby said tangentially-fed tool clears the work as said last-mentioned radially-fed tool is fed toward the work.

EDWARD P. BULLARD, III.

REFERENCES CITED

The following references are of record in the file of this patent:

UNITED STATES PATENTS

| Number | Name | Date |
|---|---|---|
| 56,339 | Tangye | July 10, 1866 |
| 673,709 | Duncan | May 7, 1901 |
| 1,118,875 | Newton | Nov. 24, 1914 |
| 1,188,667 | Lymburner | June 27, 1916 |
| 1,527,791 | Flanders | Feb. 24, 1925 |
| 1,790,943 | Mullin | Feb. 3, 1931 |
| 1,804,971 | Bullard | May 12, 1931 |
| 2,165,646 | Moise et al. | July 11, 1939 |
| 2,351,892 | Welbury | June 20, 1944 |
| 2,351,921 | Bullard et al. | June 20, 1944 |
| 2,384,809 | Bullard et al. | Sept. 18, 1945 |

FOREIGN PATENTS

| Number | Country | Date |
|---|---|---|
| 114,529 | Great Britain | Apr. 11, 1918 |